July 24, 1928.  
A. HOLMES  
OIL THERMOMETER  
Original Filed Aug. 16, 1920  2 Sheets-Sheet 2  
1,678,389
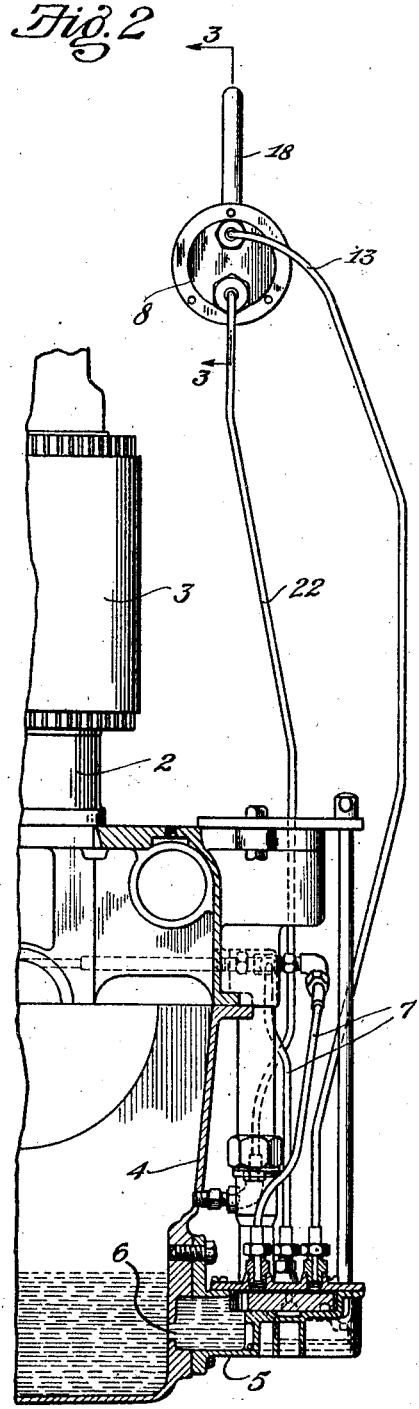
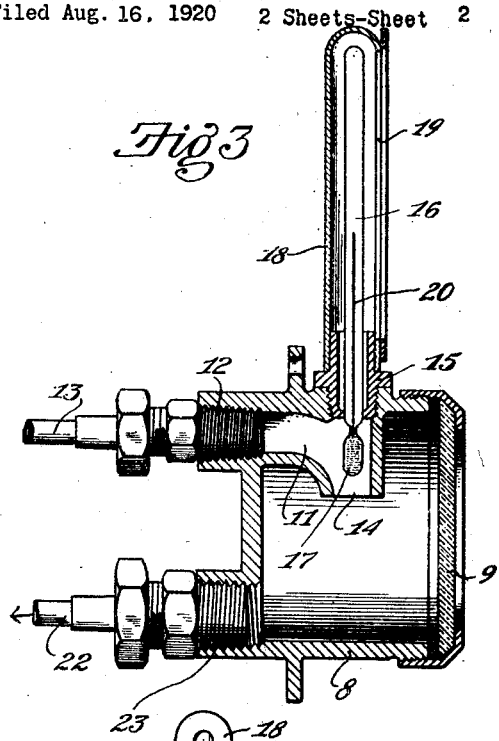
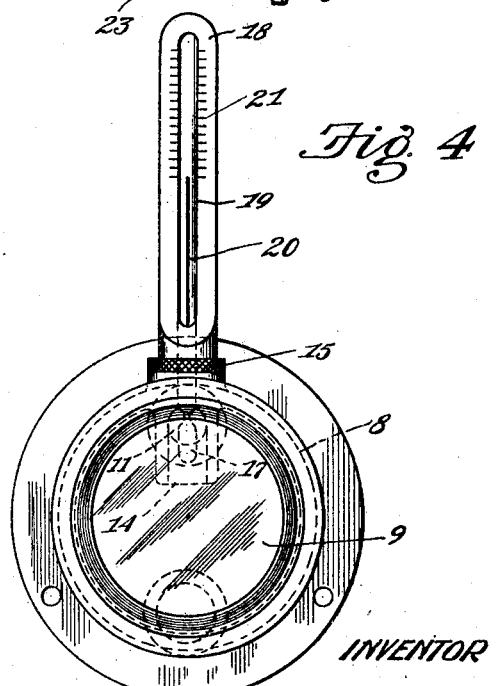
INVENTOR  
Arthur Holmes  
By: Thease, Merkel, Saywell and Bond  
ATTORNEYS.

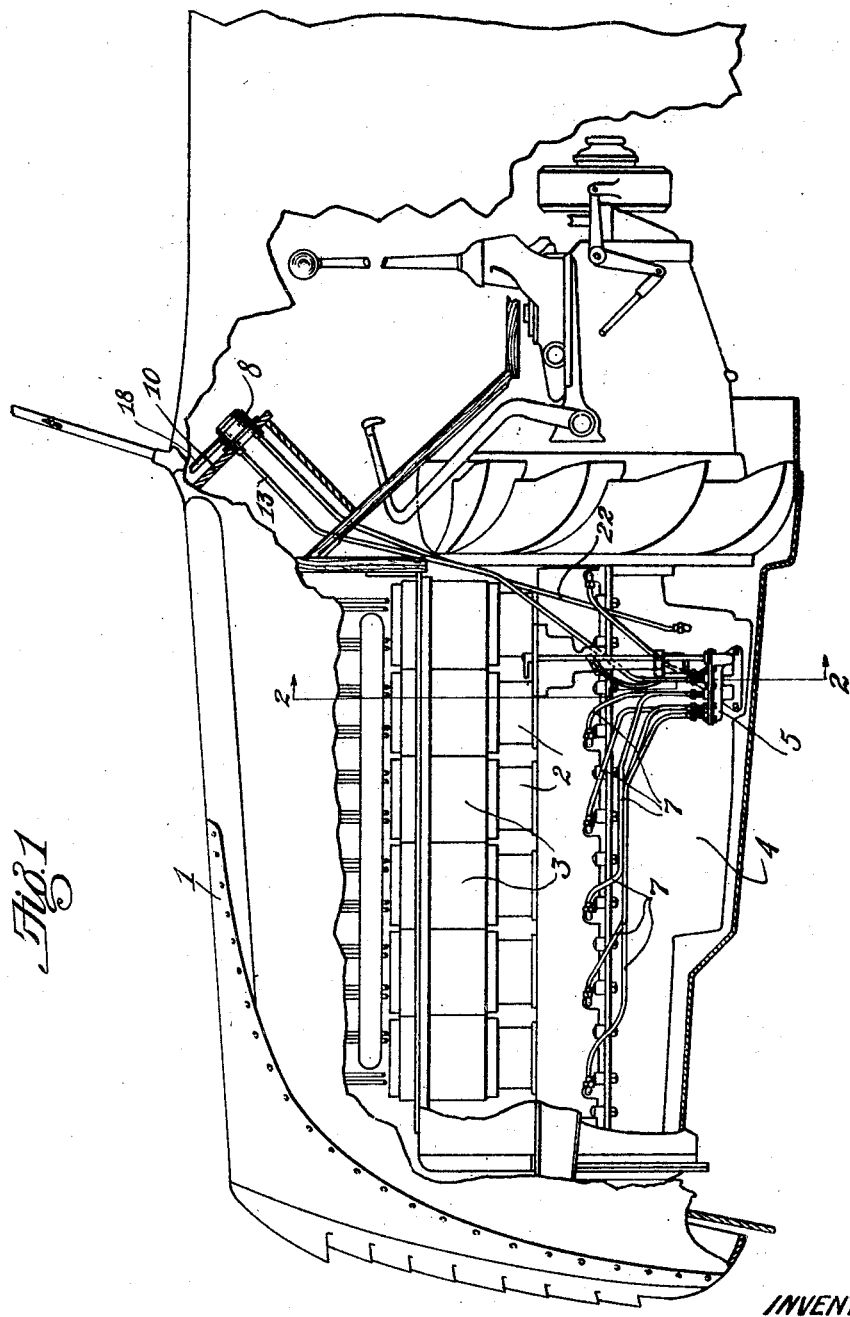

Patented July 24, 1928.

1,678,389

UNITED STATES PATENT OFFICE.

ARTHUR HOLMES, OF NEWARK, NEW JERSEY, ASSIGNOR TO THE HOLMES AUTOMOBILE COMPANY, OF CANTON, OHIO, A CORPORATION OF OHIO.

OIL THERMOMETER.

Application filed August 16, 1920, Serial No. 403,747. Renewed June 8, 1928.

The invention relates to a thermometer for indicating the temperature of the oil in the crank case of an automobile engine; and the object of the improvement is to locate such a thermometer in a place where it may be conveniently inspected by the chauffeur while driving the machine.

This object may be attained by providing a sight casing upon the instrument board having an inlet port for receiving oil from the crank case and an outlet port for returning oil thereto, and by mounting a thermometer in or upon the sight casing with its bulb within or adjacent to the inlet port so as to be bodily impinged by the inflowing oil.

A preferred embodiment of the invention is illustrated in the accompanying drawings forming part hereof, in which—

Figure 1 is a side elevation of an automobile engine and portions of adjacent parts, showing the general arrangement of the improvement;

Fig. 2, an enlarged section of a portion of the crank case as on line 2—2, Fig. 1, diagrammatically illustrating the thermometer and the conduits leading to and from the same;

Fig. 3, an enlarged section of the thermometer on line 3—3, Fig. 2; and

Fig. 4 is a front elevation of the thermometer.

Similar numerals refer to similar parts throughout the several figures of the drawings.

The engine hood 1, the cylinders 2, the jackets 3, the crank case 4, the oil pump 5, and the other parts of the engine and the automobile may be of any well known construction.

The oil pump 5 communicates with the oil chamber near the bottom of the crank case through the port 6 and is provided with a plurality of conduits 7 leading from the pump to the several bearings of the crank shaft and other parts of the engine for lubricating the same; the oil being continuously drawn from the crank case and intermittently discharged through each conduit, once for each revolution of the pump, in the usual manner.

For the purpose of the present invention, a casing 8, provided with a sight glass or window 9 is mounted on the instrument board 10, or other convenient and conspicuous place upon the automobile where it may be easily observed by the driver; and a tubular inlet port 11 is provided in the upper part of the casing which communicates through a suitable tubular fitting 12 with a conduit pipe 13 leading from the oil pump in the same manner that the lubricating conduit pipes 7 lead therefrom.

The inner end of the inlet port 11 terminates in a downwardly opening tubular mouth 14, above which is provided a suitable fitting 15 in which the thermometer 16 is mounted in upright position with its mercury bulb 17 depending within the tubular mouth 14 of the inlet port 11.

A tubular protecting case 18 is preferably carried by the fitting 15, and extends upward around and over the thermometer to shield it from injury; and in the face of the protecting case, is provided the longitudinal slot 19 forming a sight opening through which the column of mercury 20 in the thermometer may be observed, the usual gradations 21 being provided on each side of the sight opening.

A drain pipe 22 communicates through a suitable fitting 23 with the bottom portion of the casing 8, and leads downward into the oil chamber of the crank case at a point above the pump port 6 therein, through which pipe oil is adapted to drain by gravity from the casing 8 downward into the crank case. The drainage chamber formed by the casing 8 is so large as compared with the tubular mouth 14 of the inlet port as to drain the same free of oil at all times, and permit the bulb of the thermometer to be bodily impinged by the inflowing oil.

The pump 5 is adapted to be continuously operated in the usual manner by the operation of the engine, and as illustrated and described, the parts are so arranged that the oil which is drawn from the crank case and discharged through the conduit 13, will be directed through the inlet port 11 so as to bodily impinge the mercury bulb 17 of the thermometer, and will thus cause the temperature of the oil to be registered by the thermometer; after which the same oil will drain by gravity through the outlet pipe 22, back into the crank case.

The conduit 13 is preferably made of or sheathed in a heat retaining material, so that the oil which impinges the mercury bulb will be of substantially the same temperature as the body of oil contained in the crank case of the engine, and the temperature thereof will be properly registered by the thermometer; and it is evident that the quick recurrence of the intermittent action of the oil pump serves to discharge a substantially continuous stream of oil bodily against the mercury bulb of the thermometer, at all times during the operation of the automobile, thus constantly registering the temperature of the oil in the crank case.

I claim:

1. A casing having an upper inlet port and a lower drainage chamber and outlet port for a circulating liquid, and a thermometer having its bulb above the drainage chamber and at the mouth of the inlet port in position to be bodily impinged by inflowing liquid, the drainage chamber being relatively large and deep as compared with the thermometer bulb.

2. A casing having an upper inlet port and a lower drainage chamber and outlet port for a circulating liquid, and a thermometer having its bulb above the drainage chamber and in the inlet port in position to be bodily impinged by inflowing liquid, the drainage chamber being relatively large and deep as compared with the thermometer bulb.

3. A casing and means circulating a liquid through the casing, the casing having an upper inlet port and a lower drainage chamber and outlet port for the circulating liquid, and a thermometer having its bulb above the drainage chamber and in the path of the inflowing liquid and in position to be bodily impinged thereby, the drainage chamber being relatively large and deep as compared with the thermometer bulb.

ARTHUR HOLMES.